United States Patent [19]

Fox

[11] Patent Number: 4,586,337

[45] Date of Patent: May 6, 1986

[54] TURBOCOMPOUND SYSTEM

[75] Inventor: Larry D. Fox, Columbus, Ind.

[73] Assignee: Cummins Engine Company, Inc., Columbus, Ind.

[21] Appl. No.: 571,660

[22] Filed: Jan. 17, 1984

[51] Int. Cl.⁴ .................. F02B 37/00; F02G 3/02
[52] U.S. Cl. ........................... 60/605; 60/624
[58] Field of Search ............. 60/605, 607, 608, 624

[56] References Cited

U.S. PATENT DOCUMENTS

| | | | |
|---|---|---|---|
| 2,245,163 | 6/1941 | Smith | 60/624 X |
| 2,359,065 | 9/1944 | Waeber | 60/607 |
| 4,032,262 | 6/1977 | Zehnder | |
| 4,100,742 | 7/1978 | Harp, Jr. | |
| 4,196,593 | 4/1980 | Froeliger | |
| 4,344,289 | 8/1982 | Curiel et al. | |
| 4,474,007 | 10/1984 | Kronogard et al. | 60/624 X |

FOREIGN PATENT DOCUMENTS 123878  4/1946  Australia ..................... 60/607

Primary Examiner—Michael Koczo
Attorney, Agent, or Firm—Sixbey, Friedman & Leedom

[57] ABSTRACT

A turbocompound system (50,50') for use with an internal combustion engine (10) including a turbocharger (60,60') and an exhaust gas driven power turbine (92,92'). The second exhaust gas driven power turbine is mounted on the engine front end (14) and includes a rotor (100) having a rotational axis oriented to extend in the same direction as the engine crankshaft (20). Output of the second exhaust gas driven power turbine is coupled to the engine crankshaft (20) adjacent to the engine rear end (16) by a jackshaft (130) which extends longitudinally of the engine and is located within the front end profile (150) of the engine.

8 Claims, 5 Drawing Figures

TURBOCOMPOUND SYSTEM

TECHNICAL FIELD

The present invention relates, in general, to combustion engines, and, more particularly, to exhaust energy extraction systems designed to improve performance of combustion engines while maintaining overall engine size as compact as possible.

BACKGROUND ART

Internal combustion engine designers have made numerous attempts to extract energy, which would otherwise be lost, from the exhaust gases to improve the power output and fuel efficiency of the engine. A turbocharger is one example of an exhaust energy extraction system which has been used to great success to improve the performance of internal combustion engines. A turbocharger typically includes an exhaust gas-driven turbine mounted on a common shaft with an impeller-type compressor which is designed to supply ambient air under pressure to the intake manifold of the engine.

While turbochargers have been very effective in improving engine performance, the cost and size of conventional turbochargers have limited their universal adoption. Attempts to improve further the performance of turbochargers has led to the development of two stage turbochargers but such units aggrevate even further the problem of excessive size associated with the use of turbochargers.

Accordingly, efforts have been made to design more compact turbocharger units. For example, Zehnder, in U.S. Pat. No. 4,032,262, suggests that the space occupied by a two-stage exhaust-gas driven turbocharger can be reduced by using a common housing for the high pressure and low pressure gas flow passages of the two stage turbocharger. Froeliger, in U.S. Pat. No. 4,196,593, extends the Zehender common housing concept to include orienting the turbocharger shafts of a two stage turbocharger to be mutually perpendicular to reduce the overall size of a turbocharged engine so as to make the turbocharged engine as compact as possible. Curiel et al, in U.S. Pat. No. 4,344,289, discloses arranging the compression ratios of the turbochargers used in a two-stage turbocharger system to provide a compact exhaust-driven turbocharger system.

Another form of exhaust energy extraction system includes a turbocompound system which, normally, includes a turbocharger and a second exhaust gas driven power turbine fluidically connected in series with the turbocharger. The second gas-driven power turbine is located downstream of the turbocharger for receipt of the engine exhaust gases discharged from the turbine of the turbocharger. The power turbine operates to convert energy in the exhaust gases discharged from the turbocharger into mechanical energy which is mechanically coupled to the engine crankshaft to add the mechanical energy output of the power turbine to the engine crankshaft.

Adding a power turbine downstream of the turbocharger turbine imposes a backpressure on the turbocharger turbine which tends to decrease the pressure drop possible for the turbocharger turbine, thereby tending to decrease the potential power output from such turbocharger which is dependent on this pressure drop. Such an effect may require providing a turbocharger of a turbocompound system which is larger in size than a turbocharger in which the pressure drop across the turbocharger turbine is not so decreased. Thus, the turbocharger of a turbocompound system may be so large that overall engine size may offset some of the advantages intended to be realized from the turbocompound system.

Therefore, engines using known turbocompound systems, such as the turbocompound system disclosed by Harp, Jr. in U.S. Pat. No. 4,100,742 may occupy a volume which is still too large to meet demands placed on combustion engines by certain applications where high power high efficiency are required.

DISCLOSURE OF THE INVENTION

It is a main object of the present invention to provide a novel and improved exhaust energy extraction system for improving the performance of an internal combustion engine which realizes the advantages of an exhaust driven power turbine while providing a compact overall engine size.

Another object of this invention is to provide an exhaust energy extraction system including an exhaust gas driven power turbine means located adjacent to one end of the engine crankshaft for converting exhaust gas energy from the exhaust gases emitted by the engine into mechanical energy in combination with coupling means connected with said power turbine means and adapted to be connected with the opposite end of the engine crankshaft for transferring the mechanical energy produced by said power turbine means to the opposite end of the crankshaft without having to pass through the crankshaft.

A more specific object of this invention is to provide a turbocompound system for improving the performance of an internal combustion engine while maintaining a compact engine assembly, when the turbocompound system is mounted for use with the internal combustion engine. More particularly, the turbocompound engine includes an exhaust driven turbocharger and a power turbine adapted to be mounted adjacent to one end of the engine crankshaft for receiving the exhaust gases discharged from the exhaust driven turbocharger and coupling means connected with said power turbine means and adapted to be connected with the opposite end of the engine crankshaft for transferring the mechanical energy produced by said power turbine means to the opposite end of the crankshaft without having to pass through the crankshaft.

Another object of the subject invention is to provide a turbocompound system of the above type wherein the coupling means includes a jackshaft extending the full length of the engine, said jackshaft being mounted between said banks of cylinders when said power turbine means is combined with the internal combustion engine.

It is still another object of the present invention to provide a novel and improved turbocompound system adapted for use on an engine having two banks of cylinders arranged in a "V" configuration wherein both the exhaust manifold which delivers exhaust gases from the engine to the turbocharger and the jackshaft referred to above are adapted to be mounted between the banks of engine cylinders. These and other objects are accomplished by turbocompound systems for use on a combustion engine which includes an exhaust driven turbocharger and a second exhaust gas driven power turbine which is mounted on the front end of the internal combustion engine. The power turbine has a power shaft rotor oriented to have its rotational axis extending in the same direction as the axis of rotation of the crankshaft. A jackshaft extends within the front end profile of the combustion engine from the engine front end to the engine rear end and is coupled to the power turbine by mechanical coupling means which includes a fluid coupling and couples the power turbine to the crankshaft at the rear end of the combustion engine. These and other more detailed objects of the invention can be understood by considering the following Brief Description of the Drawings and Best Mode for Carrying Out the Invention.

BEST MODE FOR CARRYING OUT THE INVENTION

Figure 1:
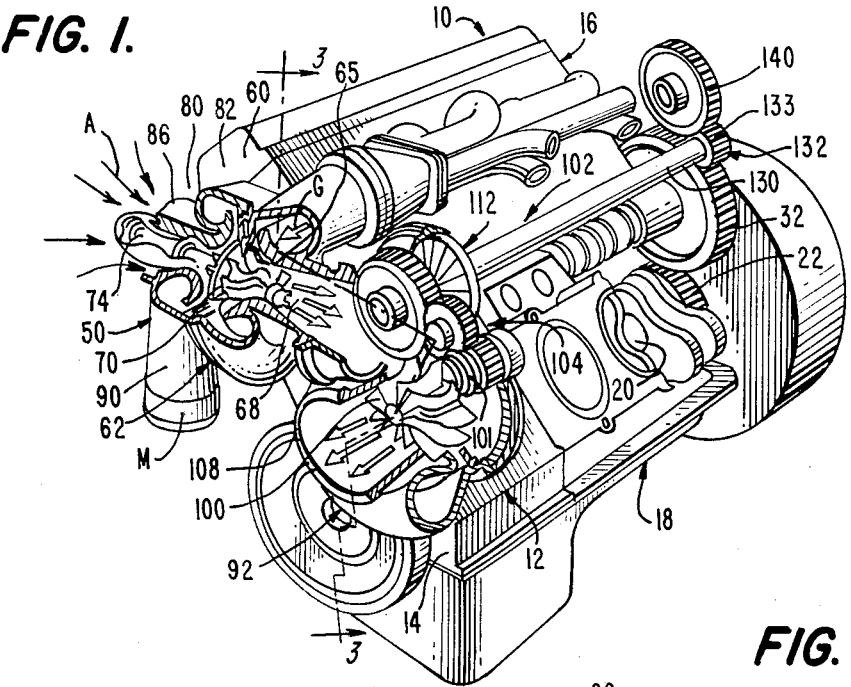
FIG. 1 is a perspective view of a combustion engine having a turbocompound system mounted thereon in accordance with the present invention.

Referring to FIG. 1, an internal combustion engine assembly 10 is shown as including an engine block 12 having a front end 14, a rear end 16 and sides 18 only one of which is illustrated in FIG. 1. The engine assembly 10 includes two banks of cylinders arranged in a "V" configuration, and a crankshaft 20 (only a portion of which is illustrated in FIG. 1) extending longitudinally of the engine block 12 from engine front end 14 to engine rear end 16. A crankshaft gear 22 is mounted on crankshaft 20 adjacent to engine rear end 16 and rotates with that crankshaft 20. A camshaft 30 is also mounted on engine block 12 and has a camshaft gear 32 mounted thereon and located adjacent to engine rear end 16 to engage crankshaft gear 22. Engine 10 further includes an exhaust manifold 40 located between the cylinder banks and extending from engine rear end 16 longitudinally of the engine body 12 toward front end 14. A turbocompound system 50 is associated with internal combustion engine 10 for improving the performance while maintaining the overall size of the combustion engine 10 and the turbocompound system 50 compact.

The turbocompound system 50 includes an exhaust driven turbocharger 60 mounted on engine front end 14 for providing a supply of engine charge air under pressure by extracting a portion of the exhaust gas energy from exhaust gases emitted by engine 10 via exhaust manifold 40. Turbocharger 60 includes a radial power turbine 62 having turbine housing 64 mounted on engine front end 14 and having an inlet 66, and an inlet coupling means 68 which fluidly couples turbine inlet 66 to engine exhaust manifold 40 to receive exhaust gases G emitted by engine 10. The exhaust manifold 40 includes a plurality of exhaust collection pipes 41 extending between corresponding engine exhaust ports (not shown) and the inlet coupling means. The exhaust collection pipes are sized to preserve the pressure pulses around in the flow of exhaust gases due to the opening and closing of the exhaust valves. By preserving the pressure pulses until they reach the throat of the turbine 62, a single throat 65 may be used in the turbine housing 64 to supply the exhaust gases to the turbine rotor 70 while obtaining the benefits normally associated with twin throated exhaust gas turbines. Turbine rotor 70 is mounted on turbocharger shaft 74. The turbocharger turbine housing 64 also includes an outlet 72 for discharging gases G' after they have been expanded in the turbine 62 to have a portion of the exhaust gas energy in those exhaust gases converted to mechanical energy. Turbocharger shaft 74 is mounted on the turbocharger turbine housing 64 to be at a right angle with engine crankshaft 20 and is is rotated by the turbocharger turbine rotor 70. Turbocharger 60 further includes a turbocharger compressor 80 mounted on engine front end 14 for providing a supply of engine charge air under pressure to an intake manifold M (only partially illustrated. Compressor 80 includes a compressor housing 82 mounted on engine front end 14 and having a turbocharger compressor inlet 86 into which ambient air flows as indicated in FIG. 1 by arrows. Compressor 80 includes a turbocharger compressor wheel 88 mounted on turbocharger shaft 74 to be rotated by that turbocharger shaft 74 to compress ambient air flowing into the compressor. The turbocharger compressor 80 includes a turbocharger compressor housing outlet 90 fluidly for discharging compressed air from the turbocharger compressor housing 82 into engine intake manifold M.

Turbocompound system 50 includes a gas-driven power turbine 92 mounted on engine front end 14 to be located adjacent to the end of engine crankshaft 20 located adjacent to engine front end 14. The exhaust gas driven power turbine 92 converts a portion of the gas energy remaining in the exhaust gases emitted by engine 10 into mechanical energy output of the exhaust gas driven power turbine 92 after turbocharger 60 has converted a first portion of that exhaust gas energy into mechanical power for driving compressor 80. The exhaust gas driven power turbine 92 is a radial turbine, and includes a power turbine housing 96 having a power turbine housing inlet 98 fluidly coupled to turbocharger turbine outlet 68 for receiving gases G' discharged from turbocharger outlet 68. The power turbine 92 further includes a power turbine rotor 100 mounted on a power turbine shaft 101 which is journaled for rotation in the housing 96. Turbine 92 operates to further expand the exhaust gases G' entering inlet 98 for converting an additional portion of the exhaust gas energy into mechanical energy. Power turbine shaft 101 has a rotational axis extending in the same direction as the rotational axis of engine crankshaft 20, and at a right angle with turbocharger shaft 74.

A mechanical coupling means 102 couples second gas-driven power turbine shaft 101 to engine crankshaft 20 adjacent to engine rear end 16 for transferring the mechanical energy produced by that power turbine 92 to engine crankshaft 20. Mechanical coupling means 102 includes a first gear train 104 mounted on turbine 92 and which includes a high speed pinion gear 106 coupled to gas-driven power turbine shaft 101 to rotate with power turbine rotor 100. Gear train 104 further includes an idler gear 108 mounted on power turbine housing 96 to mesh with high speed pinion gear 106 and a primary gear 110 mounted to mesh with idler gear 108. A fluid coupling 112 is connected to primary gear 110 transmit the rotation of primary gear 110 in a manner which prevents torsional vibrations from damaging power turbine 92 or gear train 102.

Mechanical coupling means 102 further includes a jackshaft 130 connected at one end thereof to fluid coupling 112 and extending longitudinally of engine 10 from fluid coupling 112 located adjacent to engine front end 14 to engine rear end 16. Jackshaft 130 is rotated by fluid coupling 112 and transmits the mechanical energy output of the second exhaust gas driven power turbine 92 to engine rear end 16. A second gear train 132 is mounted on a rear end of that jackshaft 130 to connect the jackshaft 130 to the engine crankshaft. The second gear train 132 can include a radial gear 133 which is mounted on jackshaft 130 to mesh with engine camshaft gear 32 to transfer the mechanical output of turbine 92 to engine crankshaft 20 through the camshaft gear 32.

Mechanical energy of gas-driven power turbine 92 is added to the output of engine 10 and to an accessory drive gear 140 via mechanical coupling means 102 and gear train 132. By coupling gas-driven power turbine 92 to the engine crankshaft 20 adjacent to engine rear end 16, torque from second gas-driven power turbine 92 is not transmitted through the length of crankshaft 20.

Figure 2:
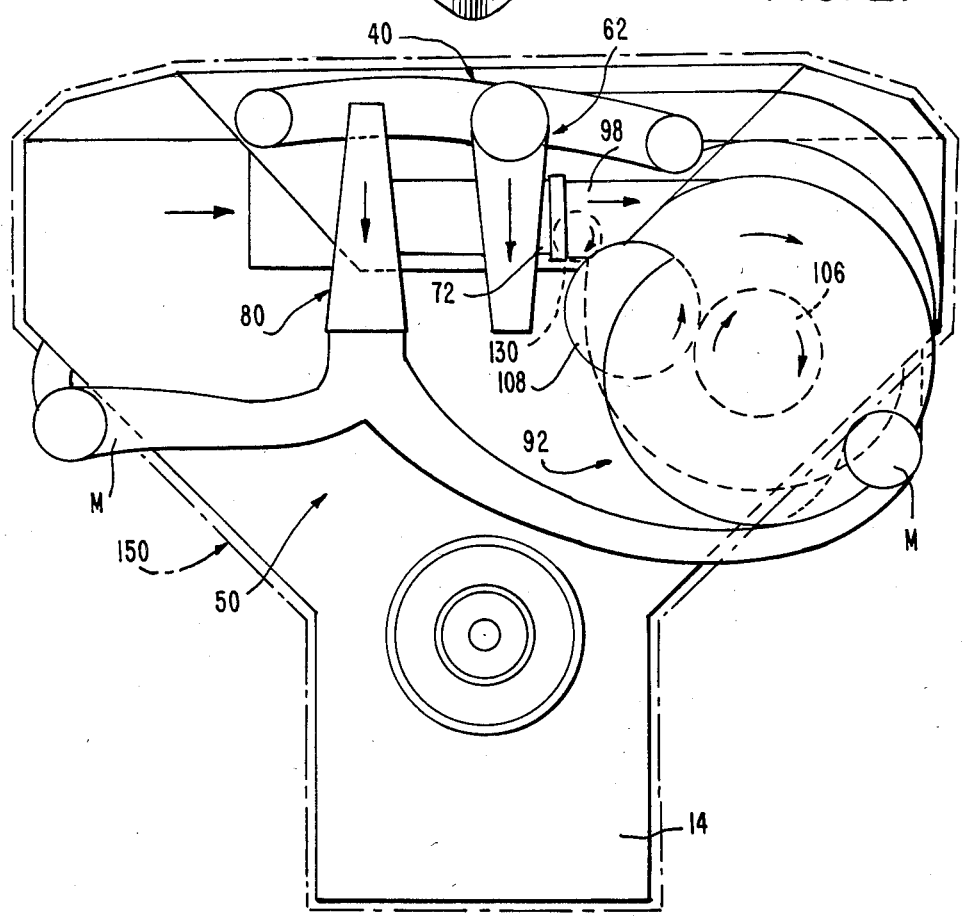
FIG. 2 is a schematic front elevation view of the combustion engine and turbocompound system shown in FIG. 1.
Figure 3:
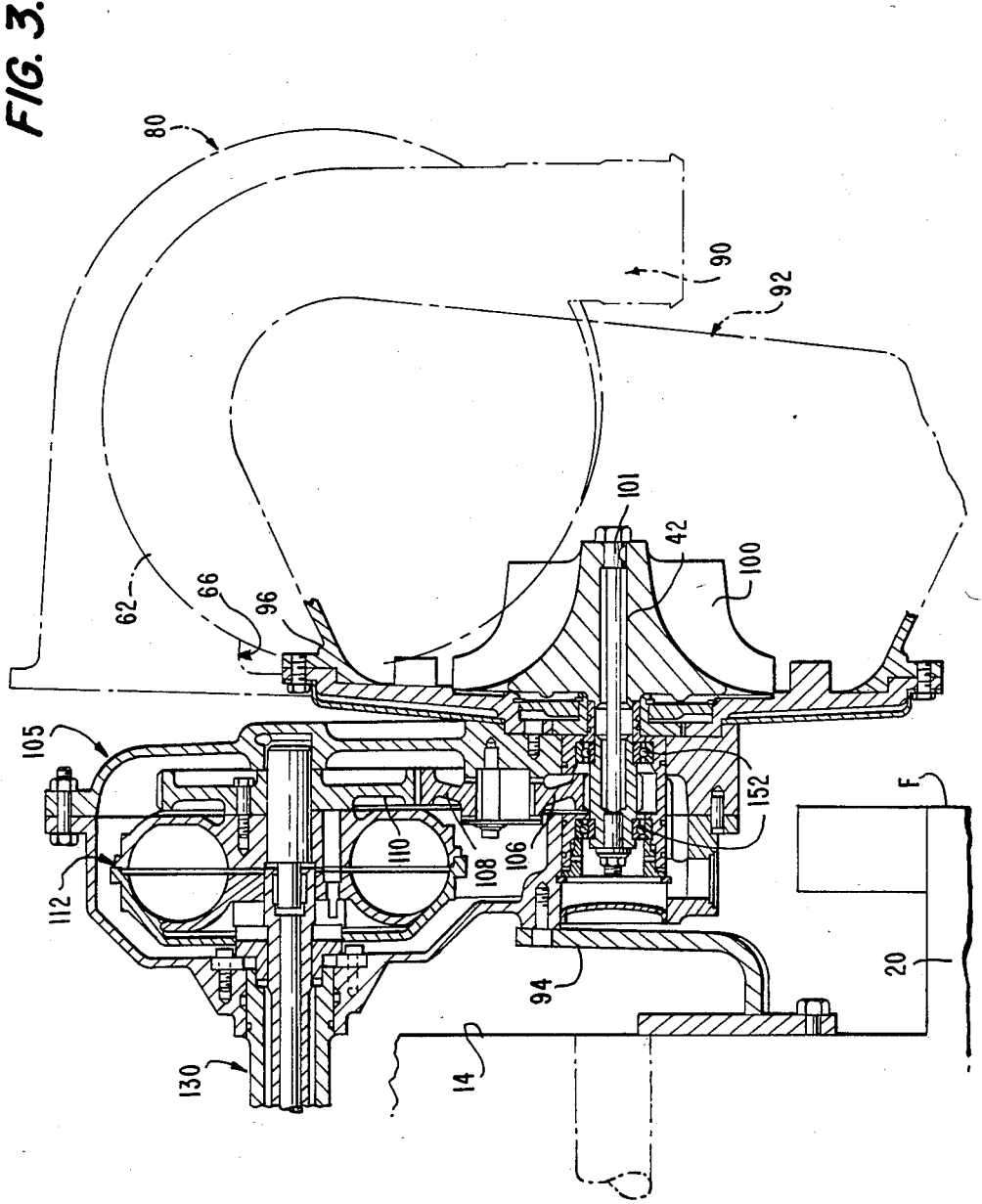
FIG. 3 is a view taken along line 3—3 of FIG. 1.

Engine 10 has a front end profile best shown by phantom line 150 in FIG. 2, and turbocompound system 50 along with exhaust manifold 40 are mounted to be substantially within front end profile 150. As shown in FIG. 3, the turbocompound system 50 is mounted on engine front end face 14 by a mounting bracket 94 to be adjacent to front end F of crankshaft 20. FIG. 3 also shows a housing 105 enclosing first gear train 104. The position of jackshaft 130 with respect to the engine 10 is also shown in FIG. 3. The power turbine rotor 100 is mounted on shaft 101 which is, in turn, journaled in power turbine housing 96 by bearings 152.

As gas-driven power turbine 92 imposes a backpressure on turbocharger power turbine 62, in order to provide the same shaft horsepower to turbocharger compressor 80 as a turbocharger turbine turbocharger turbine housing 64 is designed to be a lower flow housing than would be used on a single stage turbocharger turbine housing which does not have a gas-driven power turbine imposing a backpressure thereon.

Figure 4:
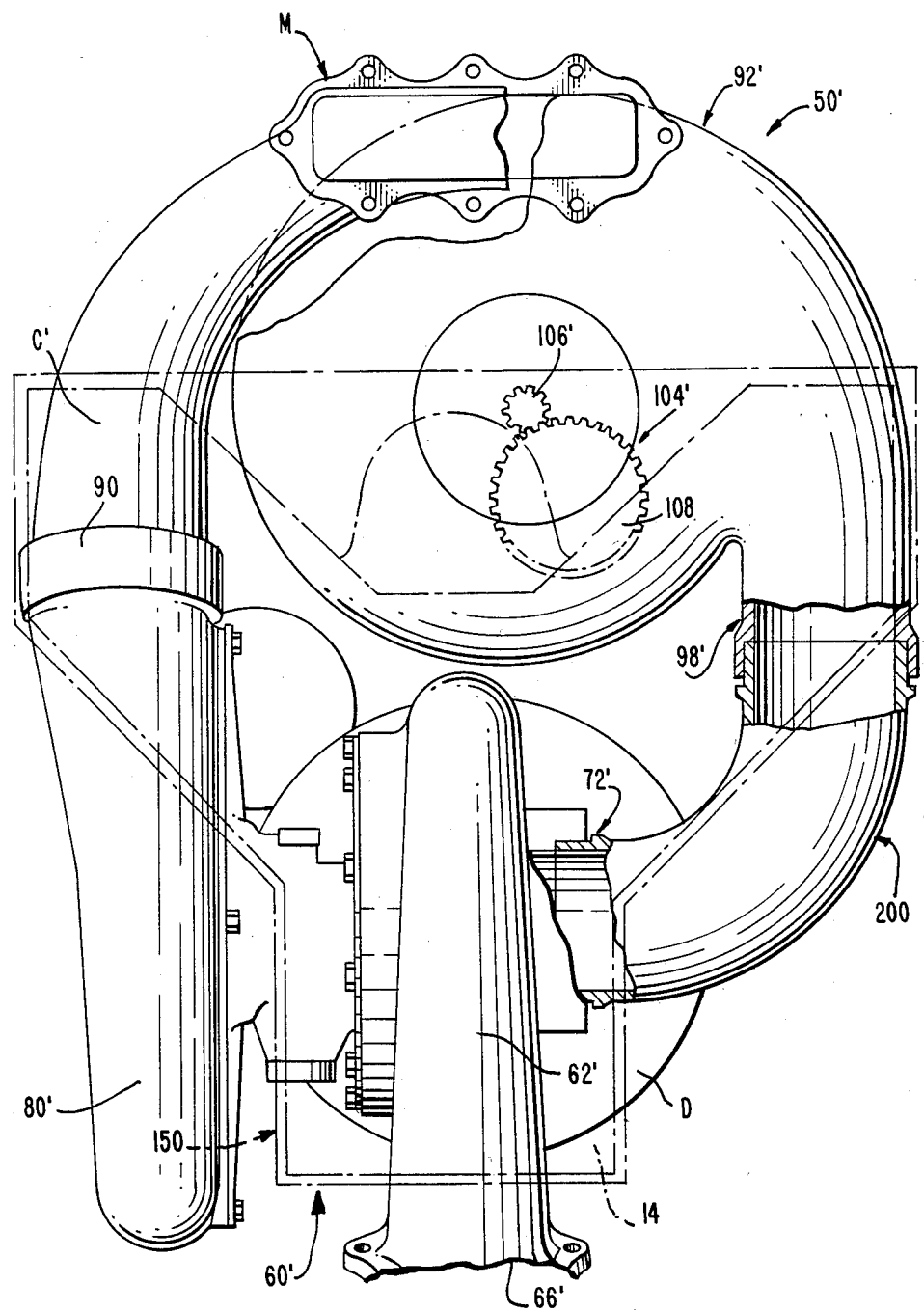
FIG. 4 is a front elevation view of the combustion engine assembly including an alternative embodiment of a turbocompound system mounted thereon.
Figure 5:
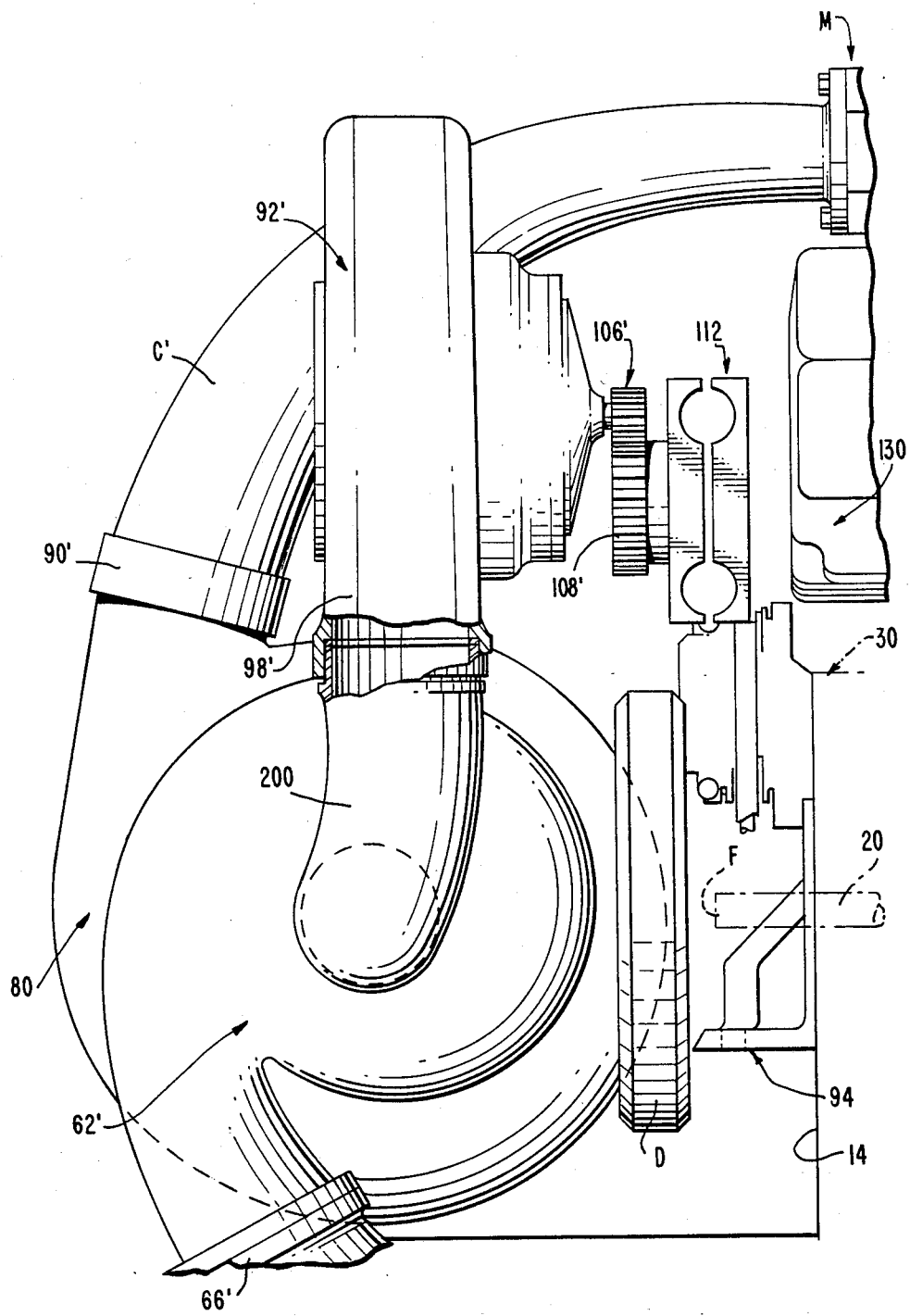
FIG. 5 is a side elevational view of the turbocompound system illustrated in FIG. 4.

An alternative embodiment of turbocompound system 50 is shown as turbocompound system 50' in FIGS. 4 and 5. Turbocompound system 50' is similar to turbocompound system 50 except that turbocharger 60' is mounted on engine front end 14 to be located in front of engine crankshaft front end F and to be below gas-driven power turbine 92' with turbocharger turbine 62' located in front of engine vibration damper D. Turbocharger turbine 62' includes an inlet 66' and an outlet 72'. An interstage duct 200 fluidly connects turbocharger turbine outlet 72' to second gas-driven power turbine inlet 98' and conduit C' couples turbocharger compressor outlet section 90' of turbocharger compressor 80' to engine intake manifold M.

Due to the positioning of second gas-driven power turbine 92' above turbocharger 60', the rotor of gas-driven power turbine 92' rotates in a direction opposite to the direction of rotation of rotor 100. Thus, turbocompound system 50' includes a gear train 104' which is modified from gear train 104 to account for the effect of the rotation of gas-driven power turbine 92'. Gear train 104' includes a high speed pinion gear 106' coupled to the second gas-driven power turbine rotor and is meshed with an idler gear 108' which is connected to the fluid coupling (not shown in FIG. 4).

As shown in FIG. 4, turbocompound system 50' is larger than turbocompound system 50 and thus lies partly outside engine front end profile 150.

INDUSTRIAL APPLICABILITY

The turbocompound system disclosed herein is adaptable for use on a internal combustion engine which has been uprated from 500 bhp to 1000 bhp. Such an engine was developed by Cummins Engine Company of Columbus, Ind. in a Low Compression Ratio V903 (LCR-V903) program and reported in SAE Technical Paper Series No. 830505 titled "Uprate of Cummins V-903 Diesel Engine to 1000 bhp for Military Application", with the disclosure of this SAE technical paper being incorporated herein by reference. The turbocompound system of the present invention can be adapted to include variable area turbocharger turbine inlet design and to be used in conjunction with an adiabatic engine being developed at Cummins. The jackshaft can be modified to include a center bearing to prevent the jackshaft from running above its first critical speed. Furthermore, engine 10 can be a "Y" or an "H" configuration in addition to the "V" configuration disclosed. The gas-driven power turbine can have the rotational axis of its rotor collinear with or parallel to the rotational axis of the crankshaft. By so locating the second gas-driven power turbine, there is no need to include a 90° (bevel type) gear set in the mechanical coupling connecting that rotor to the engine crankshaft, thereby resulting in a compact engine. The gas-driven turbines of the turbocompound system can be radial or axial flow machines, as suitable.

What is claimed is:

1. A turbocompound system for improving the performance of an internal combustion engine without substantially increasing an end viewed profile of the engine to which it is mounted in use, comprising:
    (a) an exhaust driven turbocharger means having an exhaust manifold means extending in an axial direction for collecting exhaust gases from engine cylinders and delivering the gases to an outlet end thereof, exhaust turbine means for extracting energy from the exhaust gases, said exhaust turbine means being provided with an inlet connected to the outlet end of the manifold and an outlet for discharging the exhaust gases, compressor means coupled to the exhaust turbine means for providing a supply of charge air under pressure to an air outlet thereof for delivery to air intake means of an internal combustion engine in use;
    (b) a power turbine means for extracting additional energy from the exhaust gases, said power turbine means having an intake connected to the outlet of the exhaust turbine means, and mounting means on a side of the power turbine means facing in a direction parallel to the axial direction of the exhaust manifold means that is constructed for being mounted, in use, on an end of an engine adjacent one end of a crankshaft of the engine; and
    (c) coupling means connected to the power turbine means for transferring mechanical energy produced by the power turbine means, said coupling means extending from said power turbine means to a power take-off end in a direction parallel to the axial length of the exhaust manifold means by an amount that is sufficient for enabling the power take-off end to be connected, in use, to an opposite end of the engine crankshaft from said one end thereof in a manner for transferring the mechanical energy produced by the power turbine means adjacent said one end of the crankshaft to the opposite end of the crankshaft without having to pass therethrough.

2. A turbocompound system as defined in claim 1, wherein the system is configured for use with an internal combustion engine including two banks of cylinders, wherein said coupling means includes a jackshaft of a length constructed for extending the full length of the engine, and is oriented parallel to said axial direction so as to enable it to be mounted between said banks of cylinders.

3. A turbocompound system as defined in claim 2, wherein said exhaust manifold means includes a plurality of separate exhaust collecting pipes adapted to be connected to individual exhaust ports, said exhaust collecting pipes being shaped to preserve exhaust gas pressure pulses issuing from the engine when the exhaust gases are provided to the turbocharger means, and further wherein said exhaust gas turbine means has a turbine rotor and a turbine housing containing a single throat for supplying the exhaust gases received from said exhaust gas manifold to said turbine rotor.

4. A turbocompound system as defined in claim 2, wherein said coupling means includes a first gear train for connecting said power turbine means to one end of said jackshaft adjacent said power turbine means and a second gear train serving as the power take-off end of the coupling means.

5. A turbocompound system as defined in claim 4, wherein said coupling means further includes a fluid coupling for transferring mechanical energy produced by said power turbine means from said first gear train to said one end of said jackshaft.

6. A turbocompound system as defined in claim 5, wherein said second gear train includes a camshaft gear for use with an internal combustion engine of the type having a camshaft driven by a camshaft gear coupled to the engine crankshaft.

7. A turbocompound system as defined in claim 1, wherein said turbocharger means includes a turbocharger shaft having a rotational axis perpendicular to said axial direction and said power turbine means includes a power turbine shaft having a rotational axis parallel to said axial direction.

8. A turbocompound system as defined in claim 1, wherein said power turbine means is vertically displaced relative to said turbocharger means when said axial direction is horizontal.

* * * * *